United States Patent
Yang et al.

(10) Patent No.: US 8,941,368 B2
(45) Date of Patent: Jan. 27, 2015

(54) SKIP MODE METHOD AND SYSTEM FOR A CURRENT MODE SWITCHING CONVERTER

(71) Applicant: Analog Devices Technology, Hamilton (BM)

(72) Inventors: Shanshan Yang, Shanghai (CN); Guoming Wu, Shanghai (CN); Bin Shao, Shanghai (CN)

(73) Assignee: Analog Devices Technology (BM)

(*) Notice: Subject to any disclaimer, the term of this patent is extended or adjusted under 35 U.S.C. 154(b) by 133 days.

(21) Appl. No.: 13/789,210

(22) Filed: Mar. 7, 2013

(65) Prior Publication Data

US 2014/0253061 A1  Sep. 11, 2014

(51) Int. Cl.
G05F 1/40 (2006.01)
G05F 1/46 (2006.01)

(52) U.S. Cl.
CPC .................................. G05F 1/46 (2013.01)
USPC ........................................................ 323/285

(58) Field of Classification Search
USPC ........................................ 323/265, 282–286
See application file for complete search history.

(56) References Cited

U.S. PATENT DOCUMENTS

| | | | | |
|---|---|---|---|---|
| 5,821,740 A * | 10/1998 | Hodgins et al. | ................ | 323/277 |
| 8,120,335 B2 * | 2/2012 | Caldwell | ......................... | 323/224 |
| 8,253,403 B2 * | 8/2012 | Chen et al. | ...................... | 323/282 |
| 8,363,428 B2 * | 1/2013 | Moon et al. | ................. | 363/21.03 |
| 8,513,933 B2 * | 8/2013 | Notman et al. | ................. | 323/284 |
| 8,536,849 B2 * | 9/2013 | Wang et al. | ...................... | 323/284 |
| 8,643,349 B2 * | 2/2014 | Chen et al. | ...................... | 323/282 |
| 2009/0128113 A1 * | 5/2009 | Ryoo | ............................. | 323/283 |
| 2014/0084883 A1 * | 3/2014 | Tanabe | ............................ | 323/271 |

* cited by examiner

Primary Examiner — Adolf Berhane
(74) Attorney, Agent, or Firm — Schwegman Lundberg & Woessner, P.A.

(57) ABSTRACT

A method and system to inhibit the switching of a current mode switching converter having high and low side switching elements coupled to an output inductor, the other end of which is coupled to an output node, and operated with respective modulated switching signals to regulate an output voltage Vout produced at the node. A current $I_C$ that varies with the difference between a reference voltage and a voltage proportional to Vout is compared with and a current $I_{DETECT\_PEAK}$ which varies with the current conducted by the high side switching element; the result of the comparison of $I_C$ and $I_{DETECT\_PEAK}$ is used to control the regulation of Vout during normal operation. Current $I_C$ is also compared with a current $I_{DETECT\_VALLEY}$ which varies with the current conducted by the low side switching element. When $I_{DETECT\_VALLEY} > I_C$, a 'skip mode' is triggered during which the switching signals are inhibited.

17 Claims, 4 Drawing Sheets

SKIP MODE METHOD AND SYSTEM FOR A CURRENT MODE SWITCHING CONVERTER

BACKGROUND OF THE INVENTION

1. Field of the Invention

This invention relates generally to switching power converters, and more particularly to current mode switching converters that employ a 'skip' mode to prevent inductor current runaway during start-up.

2. Description of the Related Art

One method of controlling a switching converter is referred to as "current mode" control, in which the inductor current is used to regulate the output voltage. To prevent the noise generated by an 'off' to 'on' transition of the converter's high side switching element from corrupting the sensing of the inductor current, such a converter typically employs a "blanking time" at the transition point, which prevents the high side switching element from being switched off due to the noise. The duration of the "blanking time" is referred to as the converter's "minimum on-time".

However, since the high side switching element cannot be turned off during the blanking time, the inductor current will continue to increase throughout this interval. This may result in the inductor current becoming excessively high when the converter is first started up (sometimes referred to as 'soft-start') and the regulation loop is not yet in full operation, especially when the switching frequency is high.

One conventional solution for this problem is to introduce a pulsed-frequency mode (PFM) of operation during start-up, which under certain conditions causes a 'skip mode' to be triggered during which the operation of the switching elements is temporarily suspended. An example of such a converter is shown in FIG. 1. High and low side switching elements 10 and 12 are driven by pulse-width modulated (PWM) drive signals received from a gate driver 14, which is driven with a PWM signal 16 provided by an SR latch 18 to regulate the converter's output voltage Vout. An oscillator 20 provides a clock signal Clk_shot which is applied to the SET input of latch 18 such that, in normal operation, the latch is set and high side switching element 10 is turned on each time the Clk_shot signal pulses.

An error amplifier 22 produces an output $V_{COMP}$ which varies with the difference between a voltage $V_{FB}$ that varies with Vout and a reference voltage $V_{REF}$. $V_{COMP}$ is summed with a slope compensation signal $V_{RAMP}$ to provide a voltage $V_C$. Voltage $V_C$ and a signal $I_{DETECT\_PEAK}$, which varies with the current conducted by high side switching element 10, are provided to a PWM comparator 24, the output 26 of which is used to reset latch 18 in normal operation.

To prevent inductor current runaway during start-up, voltage $V_C$ is provided to a pulsed-frequency modulated (PFM) comparator 28, which also receives a predetermined PFM threshold voltage $V_{PFM}$. When $V_C$ is less than $V_{PFM}$, the output 'skip' of comparator 28 goes high. An OR gate 32 receives the output 26 from comparator 24 and output 'skip' from comparator 28 at respective inputs, and produces an output 34 which is applied to the RESET input of SR latch 18.

The operation of the converter of FIG. 1 is illustrated with the timing diagram shown in FIG. 2. When $V_C$ is less than $V_{PFM}$, this indicates that the control loop is calling for very little inductor current ($I_L$), which is an indication that $I_L$ is too high. During these periods, the 'skip' output and thus the RESET input of latch 18 are high, and the converter operates in skip mode; this prevents the latch from being set and thus no new PWM pulses are delivered to switching elements 10 and 12. However, when $V_C$ is greater than $V_{PFM}$, this indicates that the inductor current is at an acceptable level, and thus PWM pulses which regulate Vout are provided to switching elements 10 and 12.

This approach has a drawback, however, due to the fact that there is a phase lag in which $V_{COMP}$ and $V_C$ lag behind inductor current $I_L$; this is due to the effects of the converter's output capacitor $C_{out}$ and the compensation components 35 typically found in such converters. Thus, at start-up when Vout is close to zero, several minimum on-time pulses 34 can be generated before skip mode can be triggered. This may result in an unacceptably high inductor current 36, especially when the switching frequency is high. Moreover, transitions between skip mode and the normal PWM mode can cause output voltage Vout to dip and recover as it increases from zero, resulting in a large output ripple.

SUMMARY OF THE INVENTION

A skip mode method and system for a current mode switching converter are presented which address the problems discussed above.

The present method is used to inhibit the switching of a current mode switching converter having high and low side switching elements coupled to an output inductor, the other end of which is coupled to an output node, and operated with respective modulated switching signals to regulate an output voltage Vout produced at the node. The method requires:

comparing a current $I_C$ that varies with the difference between a reference voltage and a voltage proportional to Vout and a current $I_{DETECT\_PEAK}$ which varies with the current conducted by the high side switching element;

using the result of the comparison of $I_C$ and $I_{DETECT\_PEAK}$ to control the regulation of the output voltage during normal operation;

comparing the current $I_C$ and a current $I_{DETECT\_VALLEY}$ which varies with the current conducted by the low side switching element; and triggering a 'skip mode' during which the switching signals are inhibited when $I_{DETECT\_VALLEY} > I_C$.

These and other features, aspects, and advantages of the present invention will become better understood with reference to the following description and claims.

DETAILED DESCRIPTION OF THE INVENTION

Figure 1:
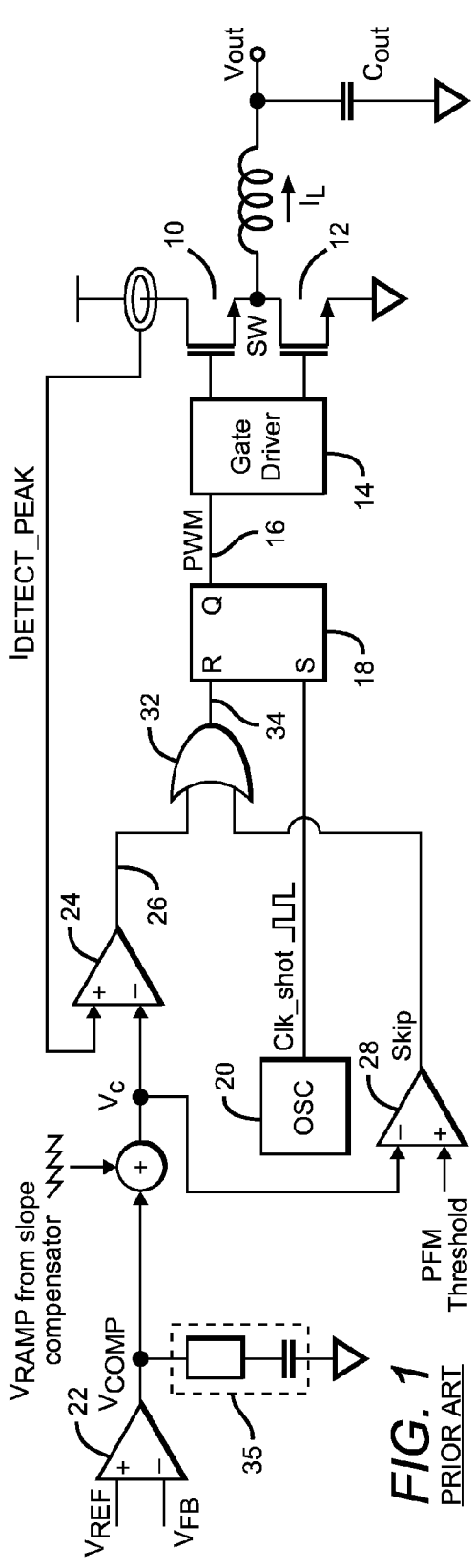
FIG. 1 is a block/schematic diagram of a known current mode switching converter.
Figure 3:
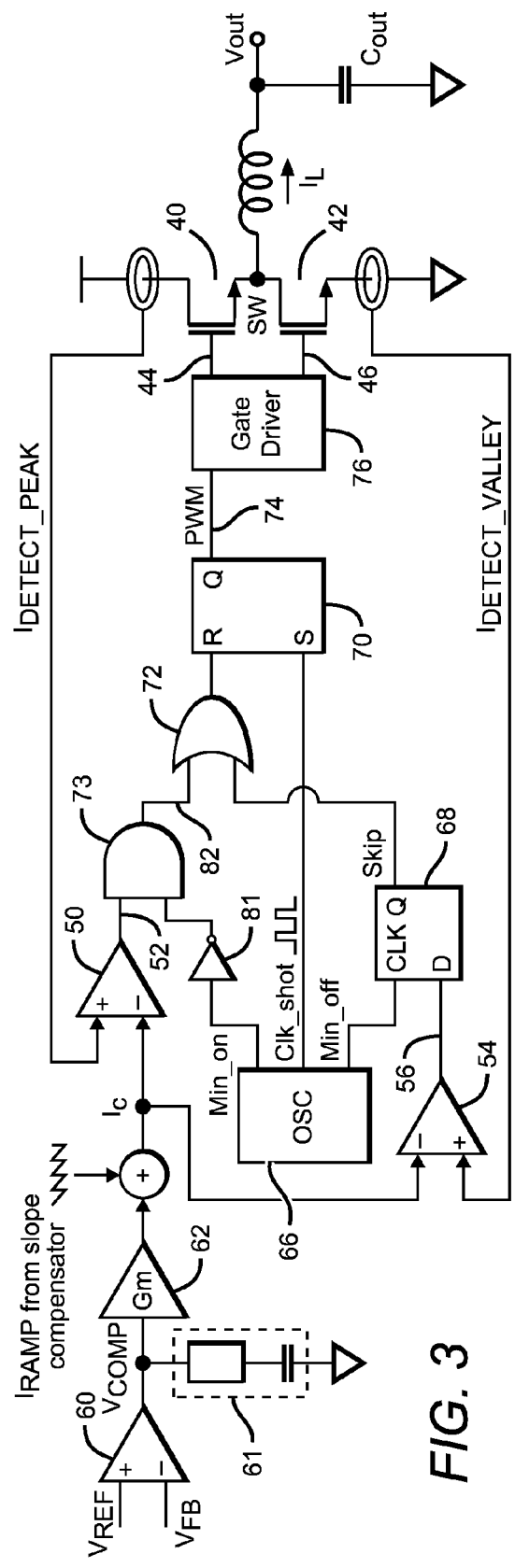
FIG. 3 is a block/schematic diagram of a current mode switching converter per the present invention.

One possible embodiment of a current mode switching converter which implements the present 'skip mode' method is shown in FIG. 3. The method is for use with a current mode switching converter having high and low side switching elements 40, 42 coupled to an output inductor L1, the other end of which is coupled to an output node, and operated with respective modulated switching signals 44, 46 to regulate an output voltage Vout produced at the output node.

The present converter comprises a first current comparator 50 which receives a current $I_C$ that varies with the difference between a reference voltage $V_{REF}$ and a voltage $V_{FB}$ proportional to Vout at a first input, and a current $I_{DETECT\_PEAK}$ which varies with the current conducted by high side switching element 40 at a second input, and which produces an output 52 arranged to control the regulation of Vout during 'normal' operation.

The converter also includes a second current comparator 54 which receives the current $I_C$ at a first input and a current $I_{DETECT\_VALLEY}$ which varies with the current conducted by low side switching element 42 at a second input, and which produces an output 56 which toggles when $I_{DETECT\_VALLEY} > I_C$. When the output of second current comparator 54 indicates that $I_{DETECT\_VALLEY} > I_C$, the converter is arranged to trigger a 'skip mode' during which switching signals 44, 46 are inhibited. Note that as used herein, the term 'normal operation' is meant to refer to the operation of the converter when it is not in skip mode.

Thus, both peak and valley inductor currents are monitored cycle-by-cycle, with both currents used to limit inductor current. By so doing, the level reached by the inductor current during start-up is likely to be less than it would have been if switching elements 40, 42 had continued to be switched when $I_{DETECT\_VALLEY} > I_C$, with the increase of voltage Vout from zero to its desired level likely to occur more smoothly than it would otherwise.

To generate current $I_C$, the converter would typically employ an error amplifier 60 which produces an output $V_{COMP}$ that varies with the difference between $V_{REF}$ and $V_{FB}$; compensation components 61 would typically be used with the error amplifier. A voltage-to-current (V-to-I) converter 62—typically a transconductance amplifier—is then used to convert $V_{COMP}$ to a current $I_{COMP}$. A summing circuit 64 is arranged to sum $I_{COMP}$ with a slope compensation signal $I_{RAMP}$ to produce current $I_C$.

The converter typically has an oscillator 66 which provides the timing signals needed to operate the converter; one output of oscillator 66 is a periodic pulse Min_off. A flip-flop 68 is arranged to receive the output 56 of second current comparator 54 at a data input and periodic pulse Min_off at a clock input, and is arranged such that the flip-flop is 'set' and toggles an output signal referred to as 'skip' to an 'on' state if output 56 indicates that $I_{DETECT\_VALLEY} > I_C$ at the time that periodic pulse Min_off pulses. Similarly, the flip-flop is reset and toggles the 'skip' signal 'off' if output 56 indicates that $I_{DETECT\_VALLEY} < I_C$ at the time that periodic pulse Min_off pulses. The flip-flop would typically operate on the rising edge of the Min_off pulse, though in some implementations the flip-flop output might be toggled on a falling edge. In the exemplary embodiment shown in FIG. 3, 'skip' is taken at the 'Q' output of D flip-flop 68, which goes high when the flip-flop is set. Note, however, that 'skip' might alternatively have the opposite polarity, depending on the specific circuit arrangement used.

The converter preferably also includes an SR latch 70. Oscillator 66 also provides a periodic clock signal Clk_shot, which is applied to the SET input of latch 70. A logic gate such as an OR gate 72 is then connected to receive the output 52 of first current comparator 50 at a first input (preferably via an AND gate 73, discussed below) and the 'skip' output of flip-flop 68 at a second input, with the output of OR gate 72 coupled to the RESET input of SR latch 70.

During 'normal' operation, 'skip' is low, and thus the output 52 of first current comparator 50 determines when SR latch 70 is reset. When $I_{DETECT\_PEAK} > I_C$, output 52 goes 'high'; the logic 'high' is passed through OR gate 72 and resets the SR latch. The output of SR latch 70 is a pulse-width modulated (PWM) signal 74; a gate driver circuit 76 receives PWM signal 74 and generates PWM switching signals 44, 46 derived from PWM signal 74.

However, if the output 56 of second current comparator 54 indicates that $I_{DETECT\_VALLEY}$ is greater than $I_C$ at the time that periodic pulse Min_off pulses, indicating that the inductor current may be nearing an excessive level, 'skip' goes 'high' and skip mode is initiated. This 'high' passes through OR gate 72 and is applied to the RESET input of SR latch 70. As long as 'skip' is high, the output of latch 70 will remain 'low', such that PWM signal 74 and switching signals 44, 46 stop toggling regardless of the output 52 of first current comparator 50. In this way, PWM pulses that would otherwise be applied to high and low side switching elements 40, 42 are adaptively 'skipped'.

The converter continues to operate in skip mode until such time that $I_{DETECT\_VALLEY}$ is again below $I_C$ at the time that periodic pulse Min_off pulses. This causes 'skip' to fall, which returns control of SR latch 70 to the output 52 of current comparator 50, thus resuming 'normal' operation.

Oscillator 66 may be further arranged to produce a periodic pulse Min_on, the rising edge of which is preferably aligned with the rising edge of periodic clock signal Clk_shot. The Min-on signal is arranged to ensure that high side switching element 40 is turned on for a minimum amount of time during each switching cycle (unless the converter is in skip mode). As noted above, this "minimum on-time" (also known as "blanking time") is employed to prevent noise generated by an 'off' to 'on' transition of high side switching element 40 from corrupting the sensing of the inductor current. To accommodate the Min_on signal, the converter might further include an AND gate 73 which receives the output 52 of current comparator 50 at a first input and the inverse of the Min_on signal at a second input (via an inverter 81 if needed), with the output 82 of the AND gate applied to the first input of OR gate 72. In this way, the Min-on pulse prevents a reset signal from being applied to the RESET input of SR latch 70 until the Min_on pulse falls. The falling edge of the Min_off pulse is preferably aligned with the rising edge of the Min_on pulse.

Figure 4:
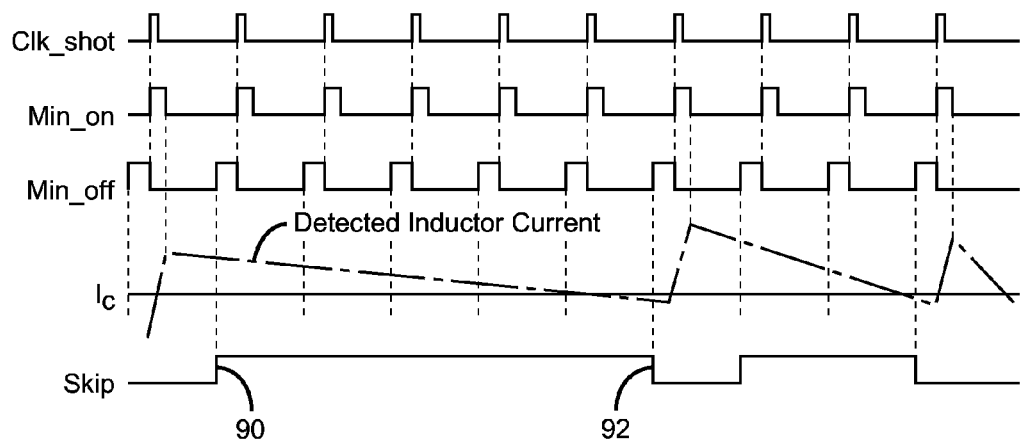
FIG. 4 is a timing diagram illustrating the operation of the converter of FIG. 3.

The operation of the converter shown in FIG. 3 is illustrated with the timing diagram shown in FIG. 4, which shows the Clk_shot, Min_on, Min_off, $I_C$ and 'skip' signals described above. Also shown is a signal which represents the detected (sensed) inductor current; this signal is essentially the sum of both the $I_{DETECT\_PEAK}$ and $I_{DETECT\_VALLEY}$ signals. When the detected inductor current exceeds $I_C$ and the Min_off pulse occurs (90), the 'skip' signal is set to 'on' and skip mode is initiated. This results in subsequent PWM signals being skipped, causing $I_C$ to start to fall. When the detected inductor current falls back below $I_C$ and the Min_off pulse occurs (92), the 'skip' signal is reset to 'off', thereby allowing PWM signals to be sent to switching elements 40, 42 and 'normal' operation to resume.

Figure 2:
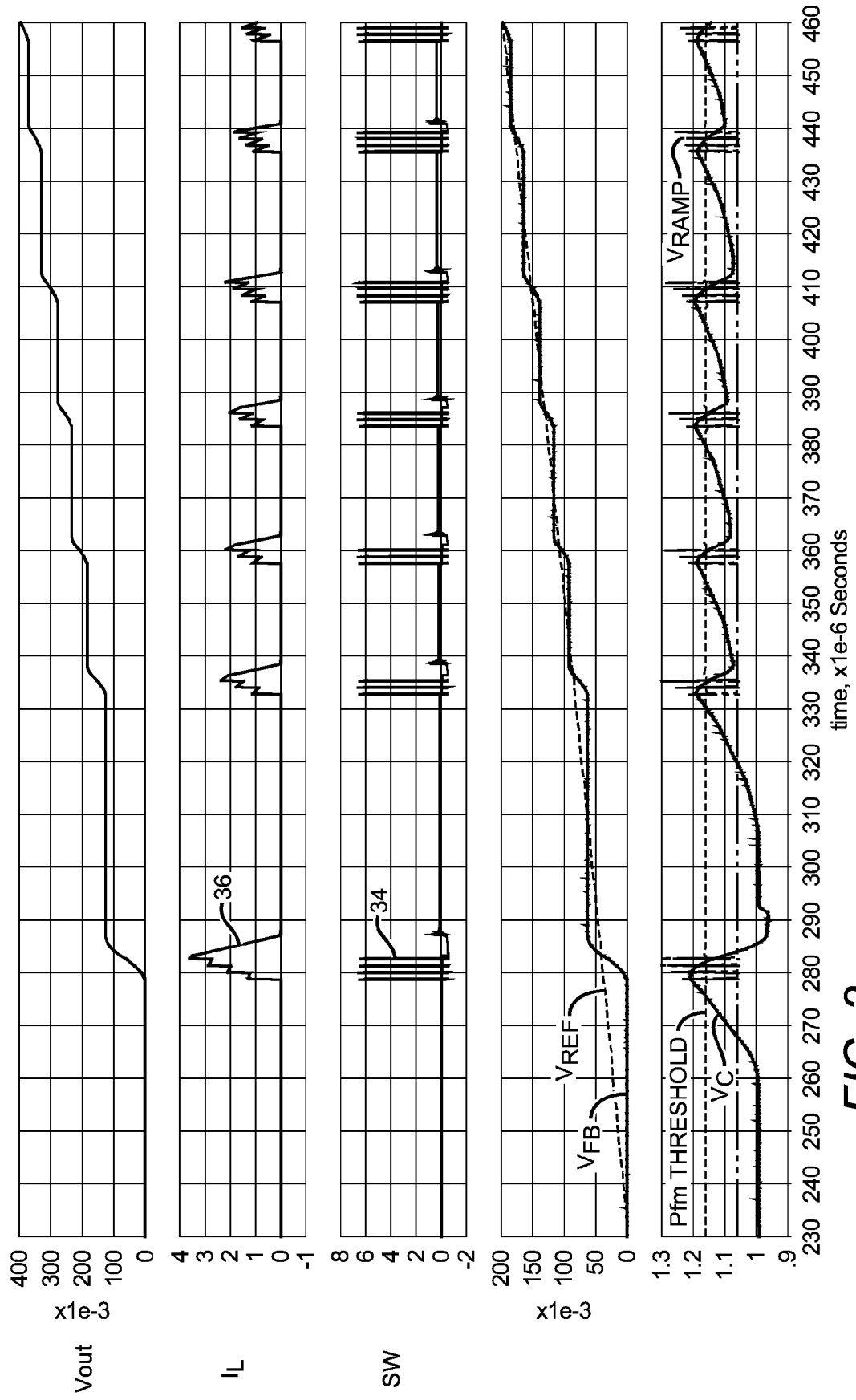
FIG. 2 is a timing diagram illustrating the operation of the converter of FIG. 1.
Figure 5:
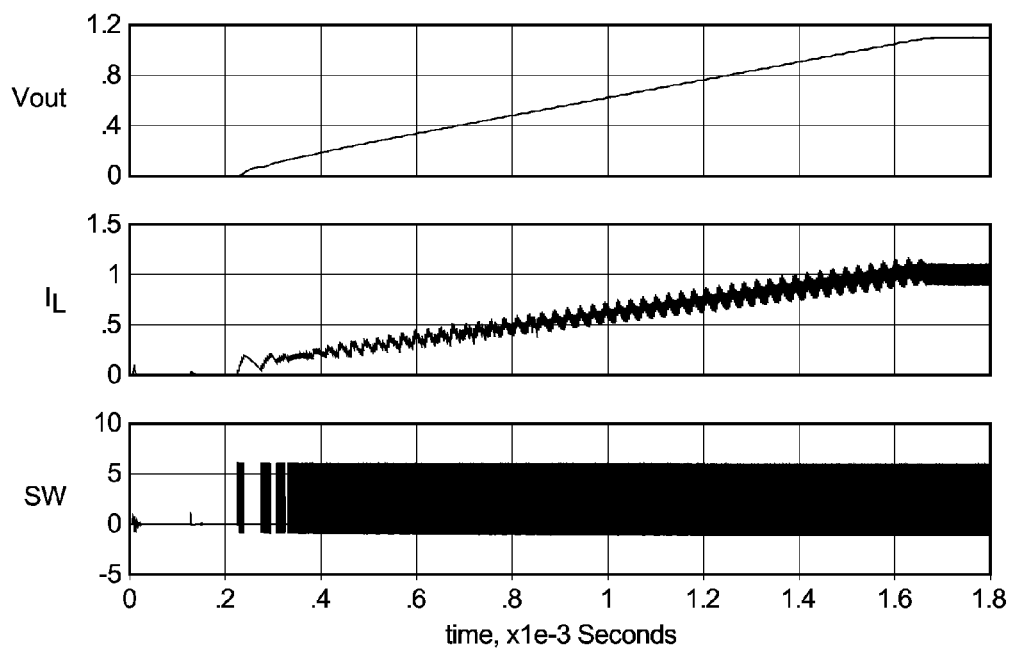
FIG. 5 is a timing diagram illustrating the performance of the converter of FIG. 3.

An example of the reduction in inductor current runaway when using the present system and method is illustrated in FIG. 5. Inductor current $I_L$ is well-controlled at start-up, with the initial spike being <0.25 A while driving a heavy load—much less than the nearly 4 A spike shown in FIG. 2 for the prior art method. Output voltage Vout also increases smoothly using the present method.

Figure 6:
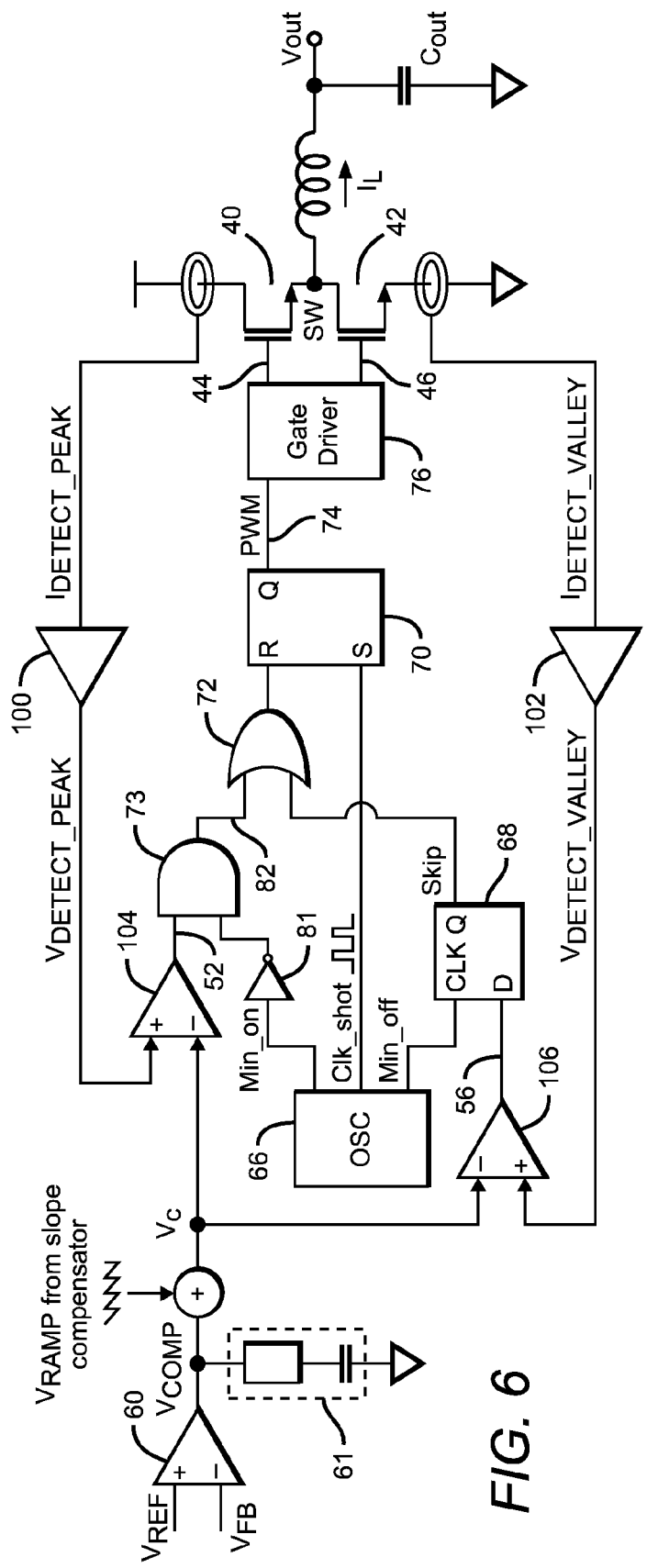
FIG. 6 is a block/schematic diagram of another embodiment of a current mode switching converter per the present invention.

Another possible embodiment of a current mode switching converter which implements the present 'skip mode' method is shown in FIG. 6. This embodiment is similar to that shown in FIG. 3, except that the $I_{DETECT\_PEAK}$ and $I_{DETECT\_VALLEY}$ signals are converted to voltages $V_{DETECT\_PEAK}$ and $V_{DETECT\_VALLEY}$ by current-to-voltage (I-to-V) converters 100 and 102, respectively. This allows current comparators 50 and 54 in FIG. 3 to be replaced by voltage comparators 104 and 106 in FIG. 6. In addition, V-to-I converter 62 can be eliminated, and $V_{COMP}$ can be summed with a slope compensation voltage $V_{RAMP}$ to produce a voltage $V_C$ instead of summing $I_{COMP}$ and $I_{RAMP}$ to produce $I_C$ as in FIG. 3. Operation of this embodiment would be similar to that of the FIG. 3 embodiment.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of inhibiting the switching of a current mode switching converter having high and low side switching elements coupled to an output inductor, the other end of which is coupled to an output node, and operated with respective modulated switching signals to regulate a desired output voltage Vout produced at said output node, said method comprising:

comparing a signal X that varies with the difference voltage $V_{COMP}$ between a reference voltage and a voltage proportional to Vout and a current $I_{DETECT\_PEAK}$ which varies with the current conducted by said high side switching element;

using the result of said comparison of X and $I_{DETECT\_PEAK}$ to control the regulation of said output voltage during normal operation;

comparing said signal X and a current $I_{DETECT\_VALLEY}$ which varies with the current conducted by said low side switching element; and triggering 'skip mode' operation during which said switching signals are inhibited when $I_{DETECT\_VALLEY} > X$.

2. The method of claim 1, further comprising:
converting $V_{COMP}$ to a current $I_{COMP}$; and
summing a slope compensation current with $I_{COMP}$ to produce a current $I_C$, said signal X being said current $I_C$.

3. The method of claim 1, further comprising:
summing a slope compensation voltage with $V_{COMP}$ to produce a voltage $V_C$, said signal X being said voltage $V_C$; and
converting currents $I_{DETECT\_PEAK}$ and $I_{DETECT\_VALLEY}$ to respective voltages for comparison with $V_C$.

4. The method of claim 1, further comprising:
generating a periodic pulse Min_off; and
setting a 'skip' signal 'on' if the result of said comparison of X and $I_{DETECT\_VALLEY}$ indicates that $I_{DETECT\_VALLEY} > X$ when said periodic pulse Min_off pulses; and
setting said 'skip' signal 'off' if the result of said comparison of X and $I_{DETECT\_VALLEY}$ indicates that $I_{DETECT\_VALLEY} < X$ when said periodic pulse Min_off pulses;
said step of inhibiting said switching signals occurring when said 'skip' signal is 'on'.

5. The method of claim 4, wherein said step of using the result of said comparison of X and $I_{DETECT\_PEAK}$ to affect the regulation of said output voltage comprises:

generating a periodic clock signal Clk_shot;
setting a latch with said clock signal Clk_shot, the output of said latch providing a modulated signal from which said modulated switching signals are derived; and
resetting said latch when said comparison of X and $I_{DETECT\_PEAK}$ indicates that $I_{DETECT\_PEAK} > X$, said latch maintained in said reset state as long as said 'skip' signal is 'on'.

6. A current mode switching converter having high and low side switching elements coupled to an output inductor, the other end of which is coupled to an output node, and operated with respective modulated switching signals to regulate an output voltage Vout produced at said output node, said converter comprising:

a first current comparator which receives a current $I_C$ that varies with the difference between a reference voltage and a voltage proportional to Vout at a first input and a current $I_{DETECT\_PEAK}$ which varies with the current conducted by said high side switching element at a second input and which produces an output arranged to control the regulation of said output voltage during normal operation; and a second current comparator which receives said current $I_C$ at a first input and a current $I_{DETECT\_VALLEY}$ which varies with the current conducted by said low side switching element at a second input and which produces an output that toggles when $I_{DETECT\_VALLEY} > I_C$, said converter arranged to trigger 'skip mode' operation during which said switching signals are inhibited when the output of said second current comparator indicates that $I_{DETECT\_VALLEY} > I_C$.

7. The current mode switching converter of claim 6, wherein said converter further comprises an error amplifier which produces an output $V_{COMP}$ that varies with the difference between said reference voltage and said voltage proportional to Vout.

8. The current mode switching converter of claim 7, further comprising a voltage-to-current (V-to-I) converter which converts $V_{COMP}$ to a current $I_{COMP}$.

9. The current mode switching converter of claim 8, further comprising a summing circuit which sums $I_{COMP}$ with a slope compensation current $I_{RAMP}$ to produce $I_C$.

10. The current mode switching converter of claim 6, further comprising:

an oscillator circuit which produces a periodic pulse Min_off; and a flip-flop which receives the output of said second current comparator at a data input and said periodic pulse Min_off at a clock input, and is arranged such that said flip-flop toggles 'on' an output 'skip' if the output of second current comparator indicates that $I_{DETECT\_VALLEY} > I_C$ when said periodic pulse Min_off pulses, and toggles 'off' said output 'skip' when the output of said second current comparator indicates that $I_{DETECT\_VALLEY} < I_C$ when said periodic pulse Min_off pulses, said system arranged such that said output 'skip' inhibits the operation of said switching signals when 'on'.

11. The current mode switching converter of claim 10, wherein said oscillator is further arranged to produce a periodic clock signal Clk_shot;

said converter further comprising:
a SR latch which generates a modulated signal from which said modulated switching signals are derived, the SET input of said SR latch connected to receive said periodic clock signal Clk_shot; and an OR gate coupled to the output of said first current comparator at a first input and the output of said flip-flop at a second input, the output of said OR gate coupled to the RESET input of said SR latch.

12. The current mode switching converter of claim 11, wherein said oscillator is further arranged to produce a periodic pulse Min_on, the rising edge of which is aligned with the rising edge of said periodic clock signal Clk_shot;

said converter further comprising an AND gate connected between the output of said first current comparator and the first input of said OR gate, said AND gate arranged to receive the output of said first current comparator at a first input and the inverse of said Min_on signal at a second input, the output of said AND gate provided to the first input of said OR gate such that said SR latch cannot be reset until said Min_on pulse falls.

13. The current mode switching converter of claim 12, wherein the falling edge of said Min_off pulse is aligned with the rising edge of said Min_on pulse.

14. A current mode switching converter having high and low side switching elements coupled to an output inductor, the other end of which is coupled to an output node, and operated with respective modulated switching signals to regulate an output voltage Vout produced at said output node, said converter comprising:

a first voltage comparator which receives a voltage $V_C$ that varies with the difference between a reference voltage and a voltage proportional to Vout at a first input and a voltage $V_{DETECT\_PEAK}$ which varies with a current $I_{DETECT\_PEAK}$ that varies with the current conducted by said high side switching element at a second input and which produces an output arranged to control the regulation of said output voltage during normal operation; and a second voltage comparator which receives said voltage $V_C$ at a first input and a voltage $V_{DETECT\_VALLEY}$ which varies with a current $I_{DETECT\_VALLEY}$ that varies with the current conducted by said low side switching element at a second input and which produces an output that toggles when $V_{DETECT\_VALLEY} > V_C$, said converter arranged to trigger 'skip mode' operation during which said switching signals are inhibited when the output of said second current comparator indicates that $V_{DETECT\_VALLEY} > V_C$.

15. The current mode switching converter of claim 14, wherein said converter further comprises an error amplifier which produces an output $V_{COMP}$ that varies with the difference between said reference voltage and said voltage proportional to Vout.

16. The current mode switching converter of claim 15, further comprising first and second current-to-voltage (I-to-V) converters which convert $I_{DETECT\_PEAK}$ and $I_{DETECT\_VALLEY}$ to voltages $V_{DETECT\_PEAK}$ and $V_{DETECT\_VALLEY}$, respectively.

17. The current mode switching converter of claim 15, further comprising a summing circuit which sums $V_{COMP}$ with a slope compensation voltage $V_{RAMP}$ to produce $V_C$.

* * * * *